United States Patent [19]

Kepley, III et al.

[11] Patent Number: 5,410,597
[45] Date of Patent: Apr. 25, 1995

[54] WIRED SEAT BACK AIRCRAFT TELEPHONE SET

[75] Inventors: Walter R. Kepley, III, Gaithersburg; Dana J. Greer, Frederick, both of Md.; Richard A. Shields, Jr., Bellevue, Wash.

[73] Assignee: Claircom Communications Group, L.P., Seattle, Wash.

[21] Appl. No.: 40,179

[22] Filed: Mar. 26, 1993

[51] Int. Cl.[6] .............................................. H04M 1/00
[52] U.S. Cl. .................................... 379/449; 379/446; 379/455
[58] Field of Search .............. 379/449, 455, 454, 433, 379/456, 458, 446, 426

[56] References Cited

U.S. PATENT DOCUMENTS 5,155,766 10/1992 Skowronski ........................ 379/455

FOREIGN PATENT DOCUMENTS

60-21636 2/1985 Japan .................................... 379/433

Primary Examiner—Thomas W. Brown
Assistant Examiner—Jack Chiang
Attorney, Agent, or Firm—Knobbe, Martens, Olson & Bear

[57] ABSTRACT

A telephone device with a handset that fits in a cradle cavity so that the outer surface of the handset is approximately flush with the surface of the cradle. A spring-loaded ejector in the cradle urges the handset against a movable tab on the cradle, that engages a lip on the handset and secures the handset in the cradle. When the tab is moved clear of the lip, the spring-loaded ejector forces the handset out of the cradle so that the handset may be grasped easily by a user, to prevent unexpected complete ejection of the handset. A tongue on the ejector engages a lip on the handset as it is ejected, so that the user must exert a small amount of additional force to remove the handset from the cradle.

20 Claims, 6 Drawing Sheets

WIRED SEAT BACK AIRCRAFT TELEPHONE SET

CROSS REFERENCE TO RELATED APPLICATION

The disclosure of this application is related in subject matter to that of the following U.S. application(s). Ser. No. 08/040,180, filed Mar. 26, 1993 by Walter Kepley III, et al., entitled "Credit Card Reader" and Ser. No. 08/040,178, filed Mar. 26, 1993, by Walter Kepley III, et al., entitled "Multi-purpose Telephone Strain Relief" which are assigned to the assignee of this application, Claircom Communications Inc. The disclosures of these applications are incorporated herein by reference.

BACKGROUND OF THE INVENTION

Field of the Invention

This invention relates to a telephone set for seat-back mounting, and more particularly to an improved telephone set for seat back mounting in an aircraft passenger cabin and for other similar applications.

Telephone sets for seat back mounting in the passenger cabin of an aircraft (and other similar applications such as a commercial motor coach) present a number of challenging technical issues that arise out of their use environment. For example, the telephone handset must be securely locked in its cradle when not in use, due to the possibility of severe acceleration forces. At the same time, it should be convenient for the user to release the handset from the cradle.

Program variable function keys are desirable to allow a user to access and use multiple voice and data communication options which the system may support. In order to facilitate use of variable functions by even an inexperienced user, it is desirable to have a display specifying the operation of each variable function key.

Typically, in an aircraft passenger cabin application, there will be a single seat back mounted telephone set to serve potential users in a group of adjacent seats. For this reason, it is desirable that the removable handset have a credit card reading capability. Similarly, it will be appreciated that the handset communication cord should allow the handset to be moved a considerable distance from the cradle, yet be completely stored when not in use. At the same time, the handset communication cord should not exert a strain on the handset when extended, or during the process of being extended.

SUMMARY OF THE INVENTION

One object of this invention is, therefore, the provision of a telephone device in which the handset is locked securely in the cradle when not in use, but can be readily released in a single-handed operation.

Another object of this invention is the provision of a telephone device in which variable function keys, and a display, are located in the handset.

A further object of the invention is the provision of a telephone device in which a magnetic strip card reader is housed in the telephone handset.

Still another object of the invention is the provision of a telephone device with a latching, automatic cord-reeling device.

Briefly, this invention contemplates the provision of a telephone device in which the handset fits in a cradle cavity so that the outer surface of the handset is approximately flush with the surface of the cradle. A spring-loaded ejector in the cradle urges the handset against a movable tab on the cradle, that engages a lip on the handset and secures the handset in the cradle. When the tab is moved clear of the lip, the spring-loaded ejector forces the handset out of the cradle so that the handset may be grasped easily by a user, to prevent unexpected complete ejection of the handset. A tongue on the ejector engages a lip on the handset as it is ejected, so that the user must exert a small amount of additional force to remove the handset from the cradle.

A spring wound, latching reel attached to the bottom of the cradle pays out and retracts the cord attached to the handset through a roller guide. The cord is attached to the handset through a molded assembly that provides both a strain relief to the cord and a noise canceling housing for the telephone microphone.

All of the electronic components are located in the handset, including a magnetic-strip card reader and a standard telephone switch array. Located in the handset between the receiver and the standard telephone switch array are three program variable function keys, and an LCD module that displays the function of each key directly above the key. The handset also includes a modem access connector that is accessible when the set is secure in its cradle.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
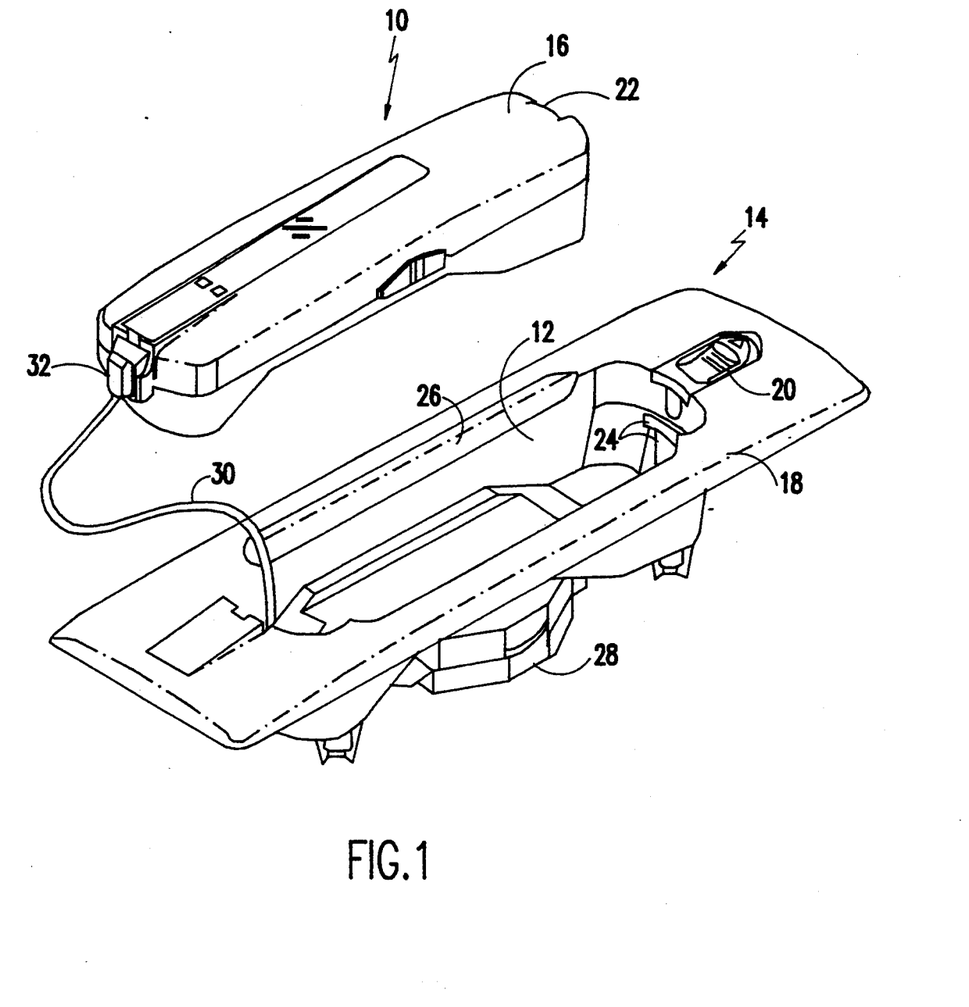
FIG. 1 is a perspective view of a telephone device in accordance with one embodiment of the invention.

Referring now to FIG. 1 of the drawings, a handset 10 fits snugly into a cavity 12 in a cradle indicated by the general reference numeral 14. When the handset 10 is secured in position in the cradle 14, the upper surface 16 of the handset is approximately flush with side flange 18 that surrounds the cradle. A spring-loaded, movable tab 20 engages a lip 22 formed in the handset and secures the handset in the cradle against an upward force exerted by a spring-loaded ejector tang 24. When the tab 20 is moved in the direction of the arrow, it moves free of the lip 22 and the ejector tang 24 forces the handset partially out of the cradle. A cut-out 26 in the side of the cradle facilitates a user in grasping the handset and removing it completely from the cradle. A spring rewind, latching reel 28 is secured to the bottom of the cradle and pays out a cord 30 secured to a strain-relief assembly 32 in the handset.

Figure 2:
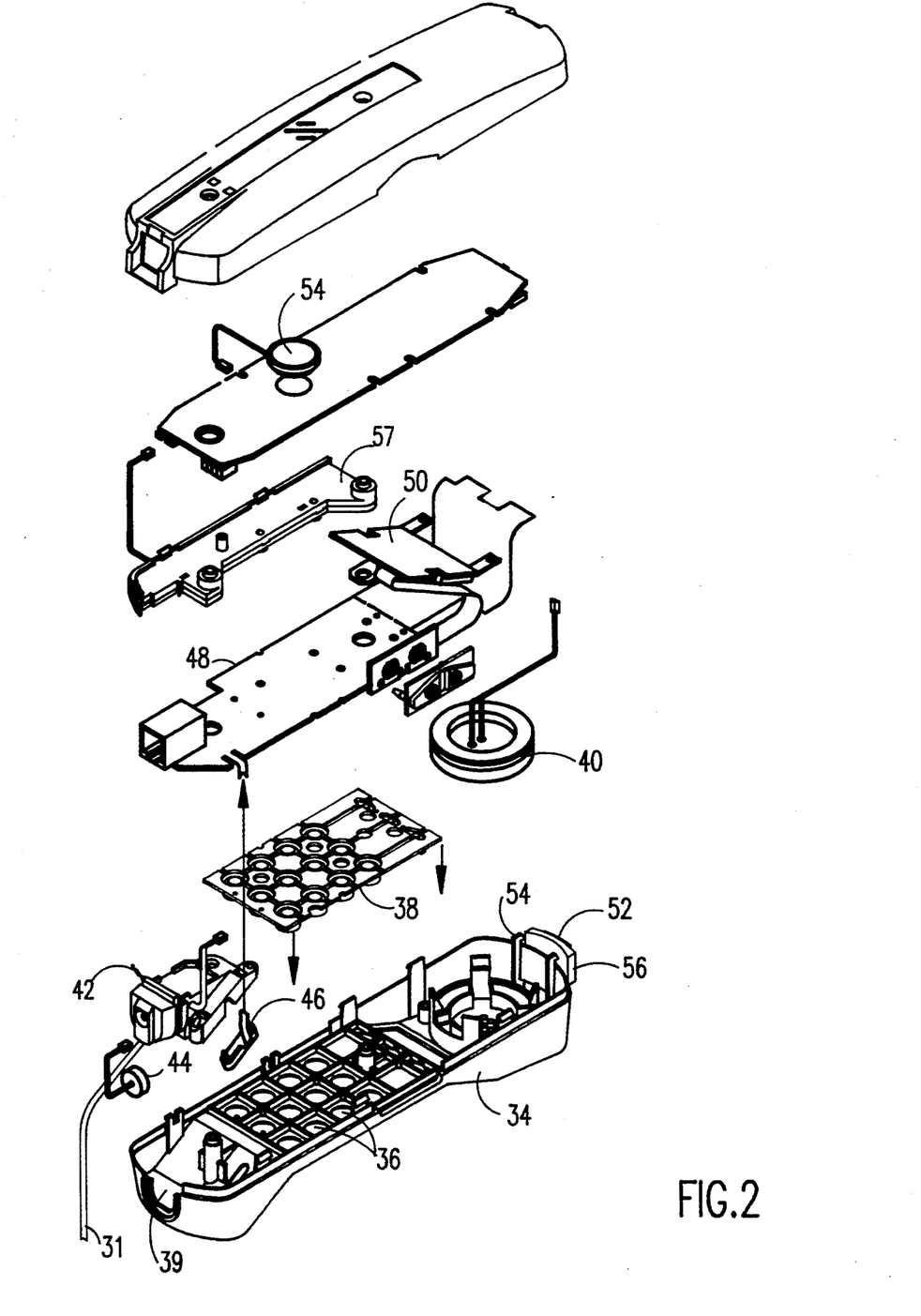
FIG. 2 is an exploded view showing components of the handset.

Referring now to FIG. 2, major components of the handset comprise a front housing 34; conveniently a molded piece with openings 36 into a push-button switch, telephone key-pad array 38 fits, along with mounting brackets for the other components. An elastomeric retainer 52 fits in a bracket 54 in the handset housing. The retainer has a lip 56 that engages a tang on the ejector and prevents the handset from being ejected completely from the cradle.

The components include a receiver 40, a subassembly 42 that combines strain relief attachment for the cord, a microphone housing, and hook switch housing. This subassembly is described in more detail in a application, Ser. No. 08/040,178, filed concurrently herewith, entitled "Multi-Purpose Stain Relief", and assigned to the assignee of this application.

The handset further includes a key-pad module 48, an LCD display module 50, a speaker 154, a microprocessor and electronics module 55, a credit card reader 57, and a rear housing cover 156. The user of the handset 10 inserts a credit card into the credit card reader 57 through an opening in the handset 10 which is positioned on the hidden side of the handset 10 shown in FIGS. 1 and 2. The credit card reader is described in more detail in application Ser. No. 08/040,180, filed concurrently herewith, entitled "Credit Card Reader", and assigned to the assignee of this application.

Figure 3A:
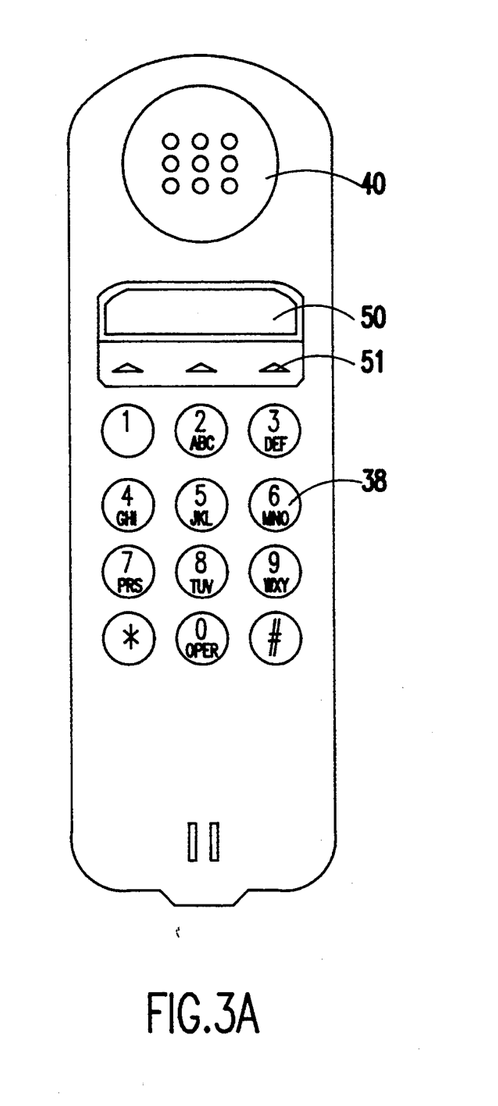
FIG. 3A is a pictorial view of the front of the handset housing.
Figure 3B:
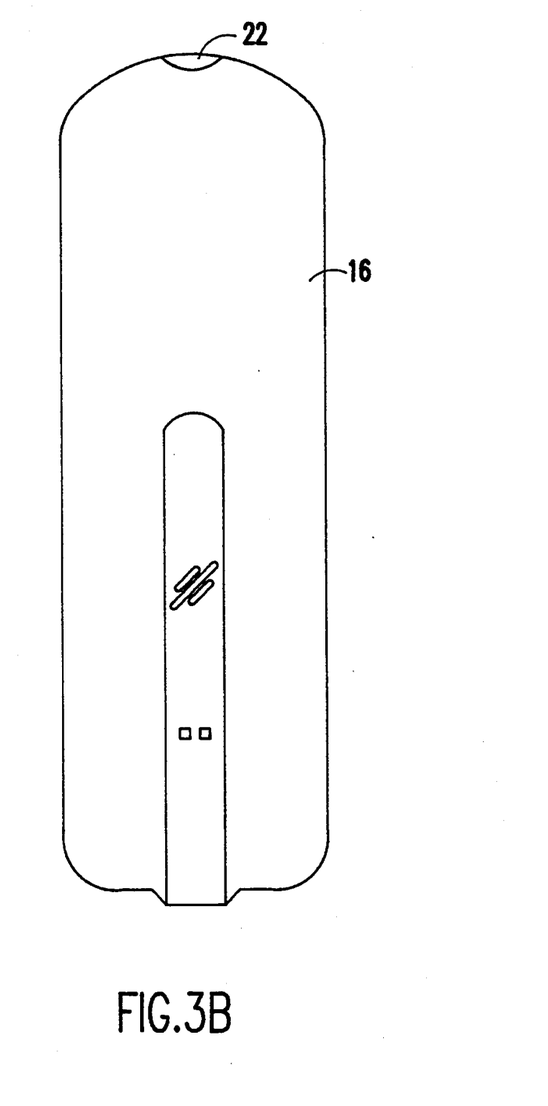
FIG. 3B is a pictorial view of the rear of the handset housing.

Referring now to FIG. 3A in addition to FIG. 3B, it is a pictorial illustration of an assembled handset, showing the telephone key array 38, and three programmable, variable function keys 51 along with the liquid crystal display 50. Both the liquid crystal display 50 and function keys 51 are located between the key array and the received 40 for ease of use.

Figure 4:
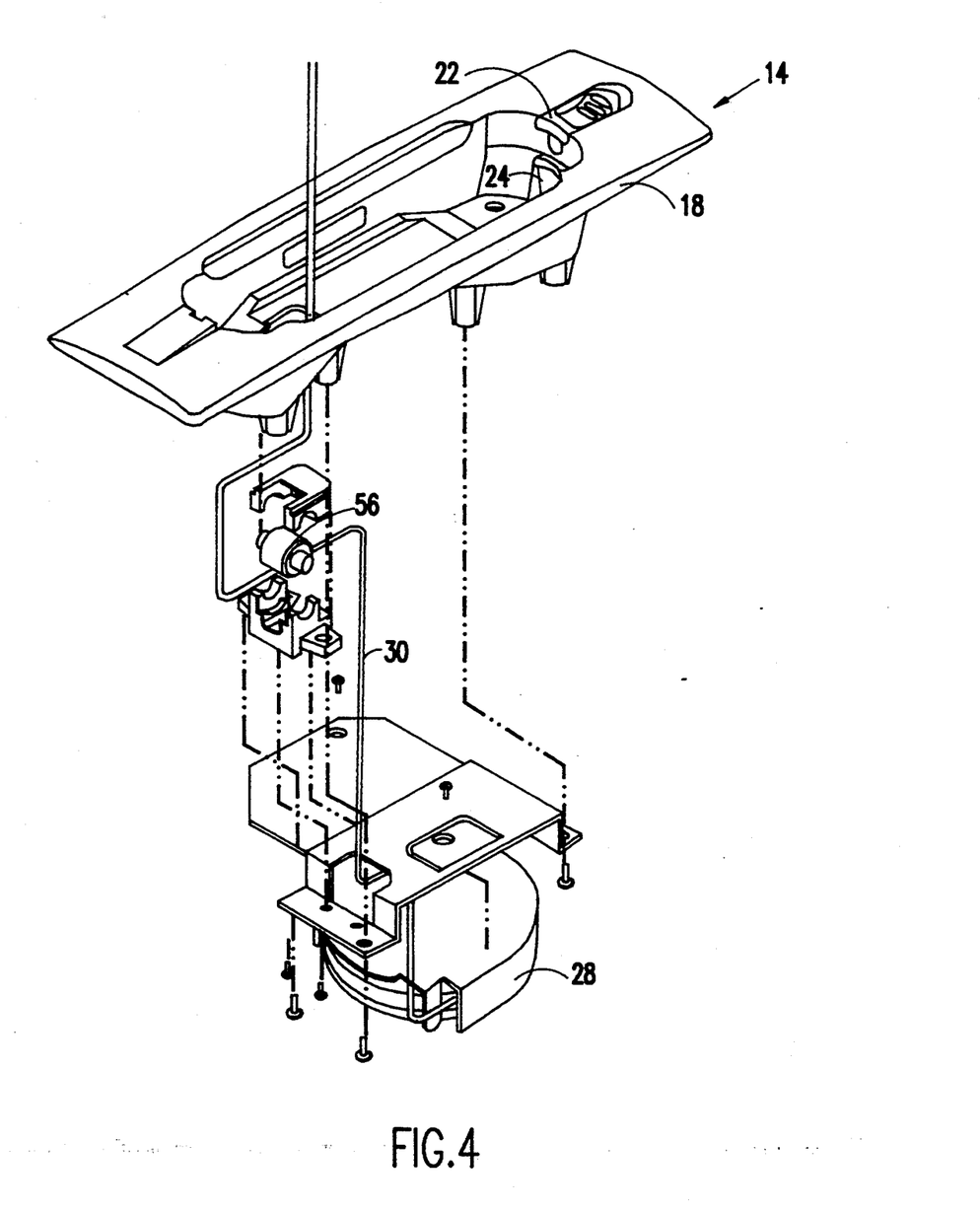
FIG. 4 is an exploded view showing additional components of the cradle.

Referring now to FIG. 4, the latching reel 28 is attached to the cradle by means of stand-offs molded into the cradle in combination with reel mounting bracket and screws. The reel 28 is a suitable commercially available, spring wound, latching reel that allows a considerable amount of communications cord to be payed out, and rewound onto the reel 28. At the same time, the reel latches when tension is reduced by the user after the cord has been extended to a desired length and rewinding tension established by the user reapplying tension to the cord. The cord 30 pays out through a roller-guide assembly 256 also secured to the underside of the cradle.

Figure 5:
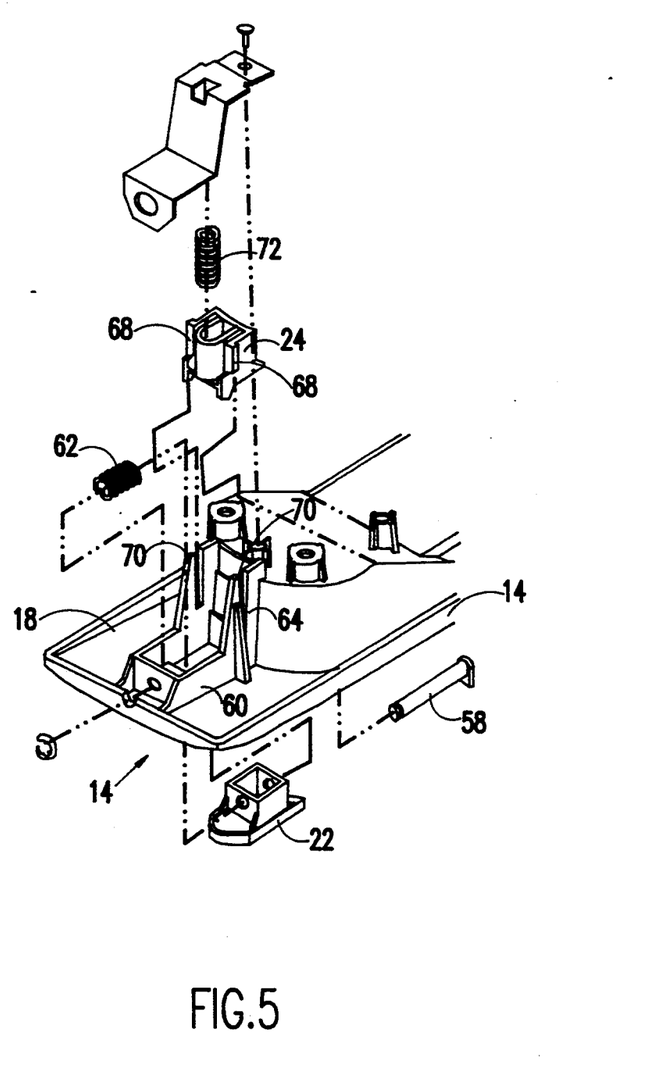
FIG. 5 is an exploded view showing components of the cradle.

Referring now to FIG. 5, a pin 58 secures the release lever 20 to a bracket 60 on the under side of the cradle 14. A compression spring 62 mounted on the pin 58 urges the release lever 20 into its position where it will engage lip 22 of the handset 10.

A bracket 64 secures the ejector 24 on the underside of the cradle with ridges 68 on the ejector riding in slots 70 in the bracket 64. A compression spring 72 urges the ejector toward the top of the cradle so that when the handset is inserted into the cradle the spring is compressed.

Figure 6:
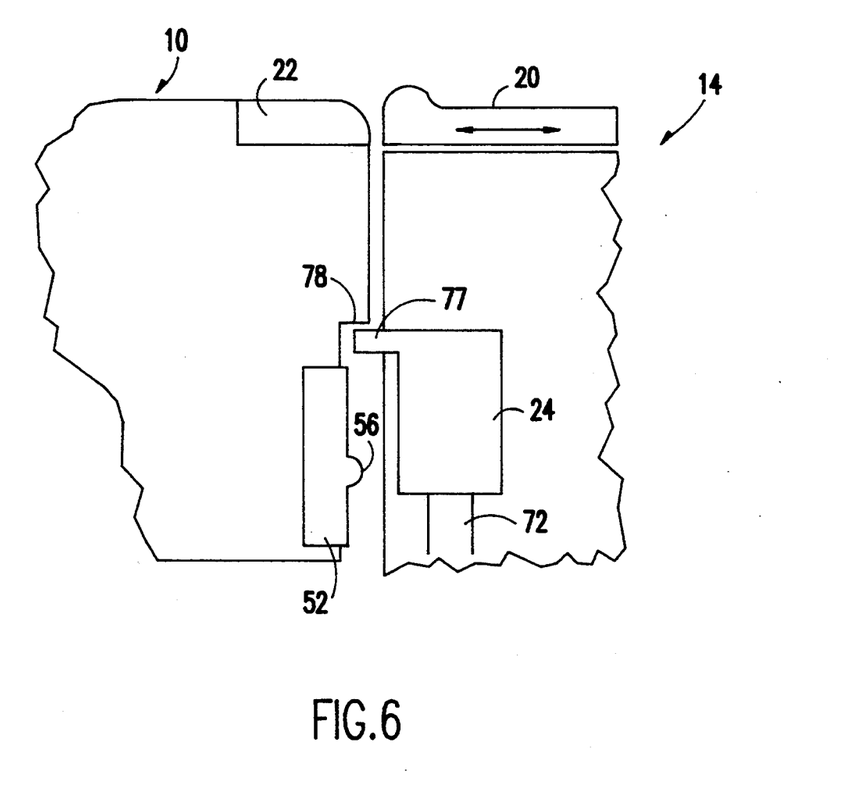
FIG. 6 is a fragmentary schematic view showing the operation of the ejector.

Referring now to FIG. 6, in operation, when the handset is inserted into the cradle, the small lip 56 on the elastomeric insert 52 is forced over an ejector tang 77, and the tang engages a ledge 78 in the handset so that the ejector is pushed toward the bottom of the cradle cavity, compressing spring 72. The release lever 20, which had been pushed clear, is released so that it engages lip 22 in the handset, locking the handset in place in the cradle. When the release lever 20 is pushed clear of the lip 22, the spring 72 forces the ejector in an outward direction, with tang 77 engaging ledge 78, pushing the handset out of the cradle. When the ejector reaches its maximum extended position, it stops. At this point lip 56 engages the tang 77 and prevents the handset from being completely ejected from the cradle by the ejector.

A user removing the handset, forces the small lip 56 over the tang 77.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A telephone set including a handset and a cradle with a cavity, in which cavity the handset is removably secured, comprising in combination:
   a handset housing, said handset housing having a first recess forming a lip in an outer surface of said housing and a second recess forming a ledge in said housing beneath said lip;
   an elastomeric ridge carried by said housing located beneath said ledge;
   a spring loaded latch in said cradle movable between a first position in which it extends over said cavity to engage said lip and a second position clear of said lip, wherein said latch retains said handset in a secured position in said cavity when said latch is in said first position; and
   a spring-loaded ejector mounted on said cradle with a tang extending into said cavity so that said tang engages said ledge on said handset housing when said handset is in said secured position and, when said latch is moved to said second position, said ejector urges said handset into a partially secured position wherein said tang engages said elastomeric ridge to retain said handset in said partially secured position.

2. A telephone set including a handset and a cradle with a cavity, in which cavity the handset is removably secured, comprising in combination:
   a handset housing, said handset housing having a first recess forming a lip in an outer surface of said housing and a second recess forming a ledge in said housing beneath said lip;
   an elastomeric ridge carried by said housing located beneath said ledge;
   a spring loaded latch in said cradle movable between a first position in which it extends over said cavity to engage said lip and a second position clear of said lip wherein said latch retains said handset in a secured position in said cavity when said latch is in said first position;
   a spring-loaded ejector mounted on said cradle with a tang extending into said cavity so that said tang engages said ledge on said handset housing when said handset is in said secured position and, when said latch is moved to said second position, said ejector urges said handset into a partially secured position wherein said tang engages said elastomeric ridge to retain said handset in said partially secured position; and
   a latching reel attached to said cradle, said latching reel paying out a telephone cord connected to said handset when said handset is removed from said cradle, said latching reel retracting said telephone cord connected to said handset when said handset is returned to said cradle, and said latching reel locking said telephone cord when tension is reduced in paying out said telephone cord and unlocking said telephone cord when tension is exerted.

3. A telephone set including a handset in a cradle with a cavity in which cavity the handset is removably secured, comprising in combination:
   a handset housing, said handset housing having a receiver and a microphone located on a front side of said housing, said housing further having a lip formed on a first surface of said housing, a ledge formed on a second surface of said housing and a ridge formed on said second surface of said housing a spaced distance from said ledge;
   a latch mechanism positioned in said cradle, said latch mechanism being movable between a first position, in which at least a portion of said latch mechanism engages said lip in said handset housing to retain said handset in a secured position in said cavity, and a second position;
   an ejector mounted on said cradle with a tang extending into said cavity so that said tang engages said ledge on said handset housing when said handset is in said secured position and, when said latching mechanism is moved to said second position, said ejector urges said handset into a partially secured position wherein said tang engages said ridge to retain said handset in said partially secured position;
   a telephone key pad array disposed on said front of said housing between said receiver and said microphone; and
   a set of programmable variable function keys and a display for indicating the function of said programmable variable function keys disposed on said front of said housing between said telephone key pad array and said receiver.

4. A telephone set including a handset in a cradle with a cavity in which cavity the handset is removably secured as in claim 1, further including a magnetic strip card reader disposed in said handset.

5. A telephone set including a handset in a cradle with a cavity in which cavity the handset is removably secured as in claim 2, further including a magnetic strip card reader disposed in said handset.

6. A telephone set including a handset in a cradle with a cavity in which cavity the handset is removably secured as in claim 3, further including a magnetic strip card reader disposed in said handset.

7. A telephone set including a handset in a cradle with a cavity in which cavity the handset is removably secured as in claim 1, where said handset housing further includes a receiver and a microphone located on a front side of said housing;
   a telephone key pad array disposed on said front of said housing between said receiver and said microphone; and
   a set of programmable variable function keys and a display for indicating the function of said programmable variable function keys disposed on said front of said housing between said telephone key pad array and said receiver.

8. A telephone set including a handset in a cradle with a cavity in which cavity the handset is removably secured as in claim 2, where said handset housing further includes a receiver and a microphone located on a front side of said housing;
   a telephone key pad array disposed on said front of said housing between said receiver and said microphone; and
   a set of programmable variable function keys and a display for indicating the function of said programmable variable function keys disposed on said front of said housing between said telephone key pad array and said receiver.

9. A telephone set including a handset in a cradle with a cavity in which cavity the handset is removably secured as in claim 7, further including a magnetic strip card reader disposed in said handset.

10. A telephone set including a handset in a cradle with a cavity in which cavity the handset is removably secured as in claim 8, further including a magnetic strip card reader disposed in said handset.

11. A telephone set comprising:
    a handset having a plurality of surfaces, with one of said surfaces configured so as to define a ridge;
    a cradle defining a cavity of a configuration such that said handset is removably secured in said cavity;
    a latch positioned in said cradle so as to be movable between a first position and a second position, said latch engaging a first surface of said handset in said first position and thereby retaining said handset in a secured position in said cavity; and
    an ejector positioned in said cradle, said ejector having a member which extends into said cavity so that said member engages a second surface of said handset when said handset is in a secured position, thereby urging said handset into a partially-secured position when said latch is in said second position, wherein said handset is partially dislodged from said cradle when in said partially secured position, such that said member extends into said cavity so that said member engages with said ridge to retain said handset in said partially secured position.

12. The telephone set of claim 11, wherein said handset is retained in said cradle in said partially secured position by the engagement between said member and said handset, and wherein said handset is removed from said cradle by a user grasping said handset and exerting sufficient force to overcome said engagement between said member and said ridge.

13. The telephone set of claim 11, wherein said second surface comprises a ledge and said member exerts a force against said ledge in a first direction so that said handset moves from said secured position to said partially secured position when said latch is moved to said second position.

14. The telephone set of claim 13, wherein said ridge is positioned relative to said ledge so that said member is positioned in said cavity between said ledge and said ridge and said member engages said ridge so as to oppose said force exerted by said member against said ledge in said first direction to retain said handset in said partially secured position.

15. The telephone set of claim 14, wherein said ridge is comprised of an elastomeric material which is deformable so that a user exerting additional force in said first direction against said handset can disengage said member and said ridge and remove said handset from said cradle.

16. The telephone set of claim 11, wherein both said latch and said member are spring biased.

17. The telephone set of claim 11, wherein said handset includes:
    a receiver located at substantially a first end of said handset so that said receiver is available to a user on a first side of said handset;
    a microphone located at substantially a second end of said handset so that said microphone is available to a user on said first side of said handset;

a key pad array having a plurality of keys, including a plurality of programmable function keys, located on said first side of said handset between receiver and said microphone; and a display positioned adjacent said key pad array.

18. The telephone set of claim 17, further comprising a magnetic strip card reader disposed in said handset.

19. The telephone set of claim 11 further comprising a latching reel attached to said cradle, said latching reel paying out a cord connected to said handset when said handset is removed from said cradle and retracting said cord when said handset is returned to said cradle.

20. The telephone set of claim 19, wherein said latching reel exerts constant rewinding tension against said cord while the user is exerting tension to extend said cord and, when the user stops exerting tension to extend said cord, said latching reel latches and does not exert tension against said cord until the user exerts additional tension against said cord.

* * * * *